March 21, 1950      J. W. DOBLIN      2,501,381
BROILER
Filed July 12, 1945      2 Sheets-Sheet 1
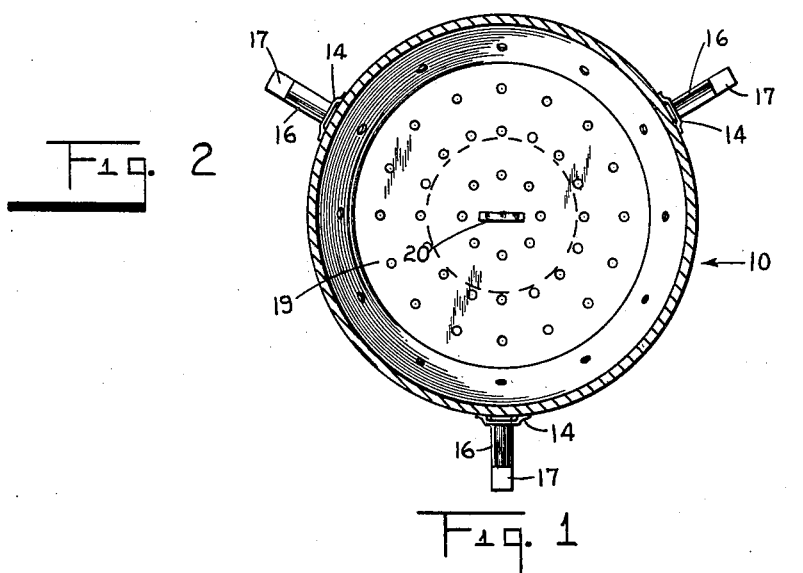
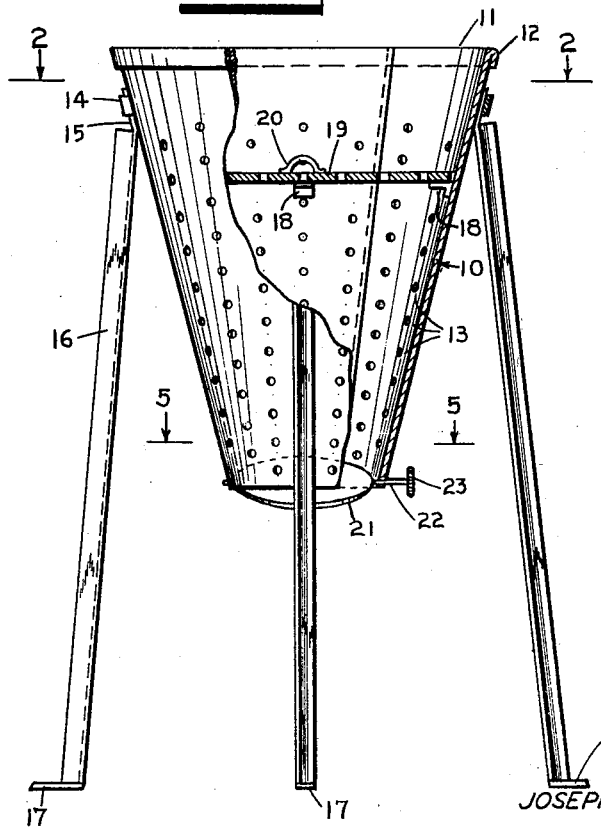
INVENTOR.
JOSEPH W. DOBLIN
BY
*Van Deventer & Grier*
ATTORNEYS.

March 21, 1950     J. W. DOBLIN     2,501,381
BROILER
Filed July 12, 1945     2 Sheets-Sheet 2
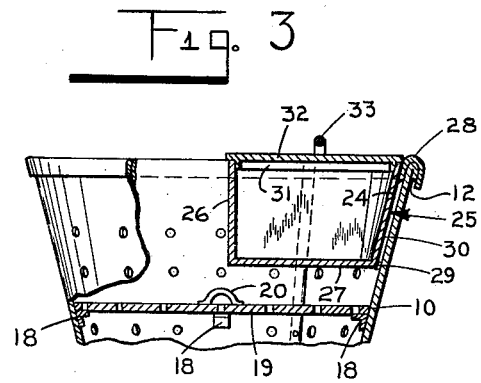
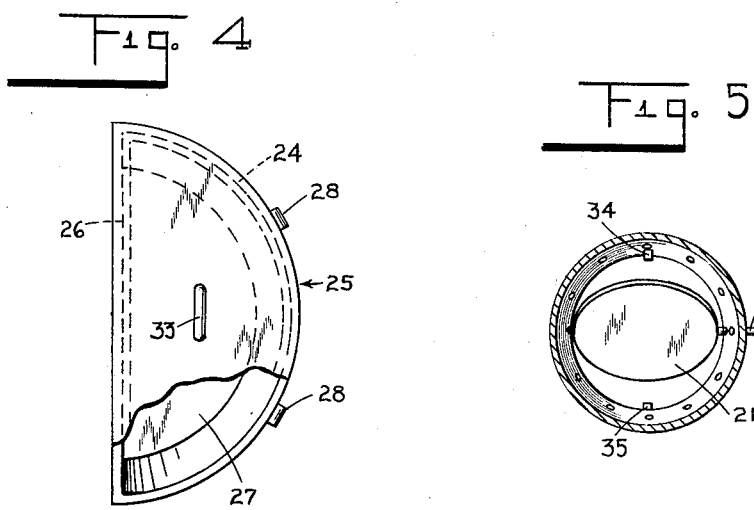
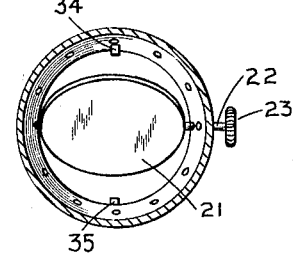
INVENTOR.
JOSEPH W. DOBLIN
BY
ATTORNEYS Patented Mar. 21, 1950

2,501,381

UNITED STATES PATENT OFFICE 2,501,381

BROILER

Joseph W. Doblin, New York, N. Y.

Application July 12, 1945, Serial No. 604,581

1 Claim. (Cl. 126—25)

This application relates to improvements in broilers, and has for an object the provision of a broiler having a body in the form of an inverted conical frustrum with a grid or grate near the top so as to provide a substantially thin bed of coals. This feature enables the user to very quickly obtain coals of the proper heat for broiling.

Another object of the invention is the provision, in a broiler having a body of inverted frustro-conical form, of sockets on said body near the top thereof into which supporting legs may be inserted. This enables the device to be knocked down very easily and transported from place to place.

Yet another object of the invention is the provision, in a broiler having an inverted frustro-conical body, of a tiltable bottom closure to catch and retain ashes, perforations being provided in the side walls of the body to supply combustion air to the fuel, and said tiltable body being adapted to be tilted to dump the ashes when desired.

Another object of the invention is the provision, in a broiler of generally circular form, of a separate removable pan adapted to be clipped on to the upper edge of the broiler body and provided with a cover, said pan being adapted to be used as an oven or heating chamber while broiling is being done with the uncovered portion of the fire.

Another object of the invention is the provision, in a broiler of the character described, of a porcelain enamel finish adapted to stand the heat of the fire contained in the broiler without discoloration, said enamel coating being also adapted to be in any one of attractive colors and/or combinations thereof.

Other objects and advantages of the invention will be apparent to those skilled in the art upon a study of the following specification and the accompanying drawings.

Referring to the drawings—

Figure 1 is an elevation of my new and improved broiler showing a portion of the wall broken away to reveal details of the construction of the interior thereof;

Figure 2 is a plan view taken along the lines 2—2 of Figure 1;

Figure 3 is a fragmentary view of the upper portion of the broiler showing my new and improved oven pan positioned thereon;

Figure 4 is a plan view of my new and improved oven pan with a portion of the cover broken away to show the interior thereof; and Figure 5 is a plan view of the lower portion of my new and improved broiler as seen along the lines 5—5 of Figure 1.

The broiler body, generally designated by the numeral 10, consists of a hollow inverted frustrum of a cone. The upper edge 11 may be provided with a bead 12 for reinforcing the same. A plurality of rows of perforations 13 are provided in the body to permit combustion air to enter.

Preferably spaced 120° apart are brackets 14 secured to the body 10 near the top thereof to form sockets for receiving the upper ends 15 of the removable feet 16. These feet may be formed of angle iron, and the lower ends 17 may be angular with respect to the main portion to provide substantial surface in contact with the ground or floor.

Circumferentially spaced apart within the body 10 is a series of brackets 18 which form supports for the removable circular grate or grid 19. The grid 19 may be provided with a handle 20 so that the grid may be lifted out at will with a poker or other instrument.

Pivotally mounted in the bottom end of the body 10 is a closure disc 21 which serves to collect ashes as they fall down from the grate 19. The disc 21 may be mounted on a shaft 22 provided with a handle 23 so that the handle may be utilized to tilt the disc 21 and thereby dump the ashes. Suitable stops 34 and 35 are positioned in the bottom end of the body 10 to orient the disc in its normal position.

Referring now to Figures 3 and 4, a pan 25 has a generally arcuate wall 24, a straight wall 26, and a bottom wall 27. Secured to the curved wall 24 near the upper end thereof are hook members 28 adapted to hook over the bead 12 on the upper end of the body 10 and thereby substantially support the pan 25 thereon. At the lower end of the curved wall 24 may be provided one or more projections 29 which may bear against the interior wall of the body 10 to hold the said curved wall substantially parallel to the interior wall of the body with a space 30 therebetween so that some of the heat from the burning charcoal bed may pass upwardly through the space 30. The bottom wall 27 and the side wall 26 are in contact with the hot charcoal and thereby furnish heat to the pan, making it an oven.

The pan is provided with a cover 32 having a depending flange 31 which forms a loose fit with the open top of the pan 25. A suitable handle 33 is secured to the cover 32 so that it may be lifted off with a poker, fork, or other instrument.

As to the finish on my new and improved broiler, I prefer to use a frit which was developed to withstand severely high temperatures. I apply this frit to the entire surface of the body member, both inside and outside, and also to the grate 19, the disc 21, and to the pan or oven 25 and its cover 32. I prefer to use black, blue, green, red and/or combinations thereof to produce pleasing decorative effects.

I have found that in using these finishes, the heat of the burning fuel does not discolor the surfaces, and they may be easily cleaned and have a new appearance after each using. I am aware that prior to the present invention, efforts were made to provide a broiler with a body of frustro conical form in which a fuel grate was supported. An example of such a structure will be found in patent to Simmons, No. 2,120,683. However, in such prior structures the advantages following from the placement of the grate near the top of the body were not known and hence the grate, being placed well below the horizontal center line of the body and relatively close to the smaller end of the body, was of small diameter and required a very substantial amount of fuel to present a bed of coals of sufficient area to effectively heat the food presented on a grill above the coals. The present invention therefore contemplates as an important feature, the placement of the grate near the top of the body and well above the horizontal center line of the body, so that very speedily after ignition of the fuel is a hot, wide-area, relatively thin, bed of coals presented and the broiling of the foods takes place with efficiency and dispatch.

Although I have herein shown and described one embodiment of the invention by way of example, it will be understood that I am not limited to the exact details herein shown and described, as many changes may be made in the arrangement shown without departing from the spirit of the invention as set forth in the following claim.

What is claimed is:

In a broiler, a hollow inverted frusto conical body having a tapering side wall, a grate positioned near the top of the body and well above the horizontal center line of the body to thereby provide a large area comparatively thin bed of burning solid fuel thereon, the body being provided with a plurality of perforations in its tapering side wall below the grate through which combustion air can enter, means to support said body, a closure for the lower end of the body, a vessel above and spaced apart from the grate, said vessel having a portion of its side wall of arcuate, inclined formation to conform to the tapering side wall of the body, spaced hook-like supports provided on the vessel and engaging over the upper edge of the body to thereby suspend said vessel inside the body from the top of the body, said supports having portions interposed between the side wall of the body and the arcuate inclined wall of the vessel to thereby space the vessel from the wall of the body to provide a heat passage between the vessel and body, said vessel being adapted to span a portion only of said grate and a portion of the fuel bed thereon, leaving the remainder of said bed for use in broiling, and a cover for said vessel, said vessel and its cover being adapted to form an oven or heating chamber.

JOSEPH W. DOBLIN.

REFERENCES CITED

The following references are of record in the file of this patent:

UNITED STATES PATENTS

| Number | Name | Date |
| --- | --- | --- |
| 81,163 | Hale | Aug. 18, 1868 |
| 301,090 | Campagnari | July 1, 1884 |
| 328,751 | Beals | Oct. 20, 1885 |
| 563,332 | Taylor | July 7, 1896 |
| 655,462 | Smith | Aug. 7, 1900 |
| 1,106,544 | Cain et al. | Aug. 11, 1914 |
| 1,207,553 | Hill | Dec. 5, 1916 |
| 1,338,870 | Sahall | May 4, 1920 |
| 1,650,529 | Montgomery | Nov. 22, 1927 |
| 1,669,852 | Britton | May 15, 1928 |
| 1,741,304 | Jackes | Dec. 31, 1929 |
| 1,840,628 | Howle | Jan. 12, 1932 |
| 2,009,189 | Ash | July 23, 1935 |
| 2,094,915 | Dawson | Oct. 5, 1937 |
| 2,101,180 | Jocobs | Dec. 7, 1937 |
| 2,120,683 | Simmons | June 14, 1938 |
| 2,122,275 | Bitney | June 28, 1938 |
| 2,231,223 | Page | Feb. 11, 1941 |
| 2,334,847 | Spiers | Nov. 23, 1943 |